United States Patent Office 3,462,377
Patented Aug. 19, 1969

3,462,377
CATALYST PREPARED BY STEAMING PARTIALLY BASE-EXCHANGED ZEOLITE X IN A MATRIX
Charles J. Plank, Woodbury, and Edward J. Rosinski, Deptford, N.J., assignors to Mobil Oil Corporation, a corporation of New York
No Drawing. Continuation-in-part of applications Ser. No. 621,138 and Ser. No. 621,144, Mar. 7, 1967. This application May 8, 1967, Ser. No. 636,588
The portion of the term of the patent subsequent to July 2, 1985, has been disclaimed
Int. Cl. B01j *11/02, 11/40*
U.S. Cl. 252—455                            6 Claims

ABSTRACT OF THE DISCLOSURE

Active catalyst for cracking and other hydrocarbon conversions results from steaming a reaction mixture of partially base-exchanged alkali metal aluminosilicates of the X type in a refractory porous oxide matrix. A suitable mixture is sodium zeolite X partially base exchanged with rare earth ions and dispersed in kaolinite.

CROSS-REFERENCES TO RELATED APPLICATIONS

This application is a continuation-in-part of application Ser. No. 621,138 and application Ser. No. 621,144, now U.S. Patent No. 3,391,088, both filed on Mar. 7, 1967 which, in turn, are continuations-in-part of application Ser. No. 492,309, filed Oct. 1, 1965; the same being a continuation-in-part of application Ser. No. 379,813, filed July 2, 1964 (now Patent No. 3,257,310), application Ser. No. 449,603, filed Apr. 20, 1965 (now Patent No. 3,210,267), and application Ser. No. 466,096, filed June 22, 1965 (now Patent No. 3,271,418).

BACKGROUND OF THE INVENTION

Field of the invention

This invention relates to a new and improved cracking catalyst characterized by unusual ability to selectively crack high molecular weight hydrocarbon oils to lighter material boiling in the gasoline range. In one embodiment, the invention is concerned with a catalyst composition comprising the reaction product of a partially base-exchanged crystalline alkali metal aluminosilicate of the X type with an inorganic oxide matrix wherein interaction of the aluminosilicate and matrix components is controlled to produce a highly active and selective catalyst. In another embodiment, the invention is directed to a method for producing such catalyst.

Description of the prior art

Catalyst of enhanced activity and having a markedly superior selectivity for production of gasoline by cracking of high boiling hydrocarbons has been widely adopted following the discoveries described in U.S. Patents such as 3,140,249 (Plank et al., July 7, 1964) and 3,257,310 (Plank et al., June 21, 1966). As shown in the earlier of these patents, crystalline aluminosilicates in such porous matrices as silica-alumina gels and equivalent refractory porous solids known to the catalytic cracking art are unusually effective cracking catalysts when so treated as to have low content of alkali metal. Effective treatments there shown include base exchange with aqueous solutions which contain cations capable of replacing the original alkali metal content of the aluminosilicates. The later patent reveals benefits obtained by steam treatment of such composites.

SUMMARY OF THE INVENTION

This invention provides a technique for the preparation of highly active catalysts of excellent stability to steam, hence high stability under reaction conditions in which the catalyst is exposed to high temperature steam atmospheres, as in many types of commercial catalytic cracking plants. The new method operates on aluminosilicates which are inherently unstable to steam due to concentration of alkali metal cations. Such high alkali metal-containing aluminosilicates are combined with inorganic oxide matrix material, preferably of high alumina content, to form a reaction mixture, which is subjected to the action of steam. In these reaction mixtures, the agent which is normally destructive of these alkali metal aluminosilicates converts the same to a highly active, steam-stable catalyst.

DESCRIPTION OF SPECIFIC EMBODIMENTS

In accordance with the present invention, it has been discovered that highly active and stable cracking catalysts can be prepared from partially base exchanged crystalline alkali metal aluminosilicates of the X type by thermally interacting the aluminosilicate with an inorganic oxide matrix so as to achieve fixation of alkali metal cations within the matrix component. Thus, when certain alkali metal crystalline aluminosilicates are mixed with an inorganic oxide matrix and thermally interacted in the presence of steam as hereinafter defined, the alkali metal migrates irreversibly into the inorganic oxide matrix and becomes insoluble. While the total alkali metal content of the composite remains the same and may be high, i.e., greater than 1 weight percent, the amount of exchangeable alkali metal in the composite is below about 0.6 weight percent and excellent stability is achieved. In contradistinction to previous methods for preparing highly active crystalline aluminosilicate catalysts wherein the alkali content of the aluminosilicate has been reduced by substantial replacement to obtain steam-stable compositions, the present invention provides a means whereby the unstable form of the crystalline aluminosilicate can be used directly to obtain stable catalyst compositions of unusually high catalytic activity and selectivity. The enhanced activity of the catalyst is dependent upon controlled interaction of the partially base exchanged crystalline alkali metal aluminosilicate zeolite of the X type with the inorganic oxide matrix so as to achieve fixation and irreversible migration of alkali metal cations within the matrix component. The unusual use of the matrix material in accordance with the invention serves to provide a dual effect of rendering alkali metal cations inactive and contributing unique properties to the resulting combination which are not possessed by either component alone.

The present invention is concerned in one aspect with a method for the preparation of a catalyst composition comprising a partially base exchanged zeolite X and an inorganic oxide matrix wherein the catalyst is prepared by forming a mixture of both components, thermally reacting the mixture at temperatures of at least 800° F. in the presence of steam for a period of at least one-half hour and thereafter recovering the resulting product, said product being characterized by having less than 0.6 weight percent, based on the total composite, of exchangeable alkali metal when treated with excess 25 percent aqueous ammonium chloride solution at 180° F. for 24 hours.

The aluminosilicates used for purposes of the invention are base-exchangeable alkali metal-containing crystalline alminosilicates of the X type which are unstable to steam. As defined herein "unstable to steam" means that such aluminosilicate will lose greater than 50 percent and usually more than 70 percent of its rigid three-dimensional structure as defined by X-ray crystallinity, sorption capacity and/or surface area, when treated with 100 percent steam at 1200° F. for 24 hours under a pressure of 15 p.s.i.g. Aluminosilicates contemplated herein meeting this definition are alkali metal-containing aluminosilicates of the X type which have been partially pre-exchanged with one or more cations selected from the group consisting of rare earth, calcium, manganese and magnesium to reduce the alkali metal content to a level which is less than 10, but greater than 4 wt. percent. As an example, when the sodium level of zeolite X is reduced to 5.9 weight percent with rare earth cations, a 98 percent loss of surface area is obtained upon steaming. As a general guide, it may be stated that base-exchangeable crystalline aluminosilicates which contain at least 4 weight percent alkali metal are unstable to steam within the definition above described. As a result of being unstable to steam such aluminosilicates are extremely poor catalysts for the conversion of hydrocarbons.

As has heretofore been stated, the crystalline aluminosilicates utilized in accordance with this invention are various base exchanged forms of zeolite X. These materials are prepared merely by contacting zeolite X with a solution of one or more salts of metals selected from the group consisting of rare earth, calcium, manganese and magnesium for a period of time to replace the alkali metal cations associated with zeolite X such that the aluminosilicate contains more than 4 weight percent, but less than 10 weight percent alkali metal.

Pursuant to the teachings of the invention, the alkali metal containing aluminosilicates of the X type is combined, dispersed or otherwise intimately admixed with an inorganic oxide matrix which, under the thermal conditions hereinbelow described, is capable of interacting with the aluminosilicate so as to achieve fixation and irreversible migration of alkali metal cations within the matrix component. The inorganic oxide matrix which can be employed for this purpose is capable of wide selection and may be amorphous, crystalline or a material which is both crystalline and amorphous.

Typical matrix components are the alumina-containing siliceous inorganic oxides which occur naturally, such as the various clay minerals. Representative clays include attapulgite, kaolin, sepiolite, polygarskite, kaolinite, bentonite, montmorillonite, illite, chlorite and halloysite. Of the foregoing, the preferred materials are the two-layered clays such as the members of the kaolinite group, i.e., kaolinite, dickite, nacrite, and halloysite. The clay materials may be utilized directly in their natural or raw state, or may be previously water-washed, acid-treated, caustic-treated, calcined or otherwise treated prior to mixing with the aluminosilicate.

Other preferred matrix materials are the alumina-containing inorganic oxides which are prepared by synthetic formulation of composites of alumina with a hydrous inorganic oxide of at least one metal selected from the group consisting of metals of Groups II-A, III-B and IV-A of the Periodic Table. Such components include, for example, silica-alumina, alumina-zirconia, alumina-titania, alumina-beryllia, as well s ternary combinations such as silica-alumina-thoria, silica-alumina-zirconia, and silica-alumina-magnesia. Particular preference is accorded synthetic composites of silica-alumina, alumina-zirconia and silica-alumina-zirconia. In the foregoing composites, alumina is generally present as the minor component and the other oxides of metals are present in major proportion. Thus, the alumina content of such composites is generally within the approximate range of at least 10 weight percent, preferably 15 to 55 weight percent, with the other hydrous inorganic oxide content ranging from 45 to 90 weight percent. When the inorganic oxide matrix is an amorphous material such as a composite of alumina with hydrous inorganic oxide of a metal, such as above described, a high alumina content, e.g., 15 to 55 weight percent, preferably 25 to 55 weight percent, is desired in order to facilitate fixation of the alkali metal cations within the matrix component. Additionally, such composites are preferably prepared in the form of a finely divided homogeneous precipitate or co-gel by techniques which are well known in the art.

The alkali metal containing aluminosilicate is dispersed, combined or otherwise admixed intimately with the matrix component in any desired manner such as in a ball mill, pulverizer, jet mill, muller mixer or the like. The mixing operation can be effected with dry materials, or in the presence of an aqueous or non-aqueous medium, e.g., water or an inert solvent such as benzene. The alkali metal aluminosilicate usually has a particle size of less than 40 microns, preferably less than 10 microns, and is mixed with the inorganic oxide matrix in the form of a slurry. The mixture can be then extruded, pelleted or otherwise agglomerated to obtain uniform or irregularly shaped particles which may vary in size from 20 microns to ¼ inch in diameter. Following the formation of pellets the composite is dried, if necessary, to remove substantially all the liquid therefrom. While drying may be effected at ambient temperatures, it is more satisfactory to facilitate the removal of liquid by maintaining the composition at a temperature between about 150° F. and 1000° F. for 4 to 48 hours.

It is a critical feature of the invention that the inorganic oxide matrix component be present in the final composite in an amount sufficient to achieve fixation and irreversible migration of alkali metal cations within the matrix component when the aluminosilicate and matrix component are subsequently thermally interacted. In this regard, the amount of aluminosilicate employed will be less than 60 weight percent and preferably less than 25 weight percent, based on the final composite.

After formation of the composite, the alkali metal containing aluminosilicate and matrix component are thermally interacted with one another at elevated temperatures of at least 800° F., preferably 1100° F. or higher, in the presence of steam for a period of at least one-half hour. As will appear from data set forth hereinafter, the exposure of the catalyst composite to thermal conditions in the presence of steam serves to render alkali metal cations harmless by effecting fixation and irreversible migration of the alkali metal cations within the framework of the matrix component. The thermal interaction may be accomplished at temperatures ranging from 800° F. up to the decomposition temperature of the particular aluminosilicate employed, which is generally less than about 1600° F., in an atmosphere consisting of a substantial amount of steam ranging from 5 to 100 percent by volume. The steam treatment may be effected at subatmospheric, atmospheric or superatmospheric pressures. Thermal interaction is controlled to achieve fixation of the alkali metal cations so that the final composite contains less than 0.6 weight percent, preferably less than 0.4 weight percent, based on the final composite of exchangeable alkali metal. At a temperature of 1200° F. under a steam pressure of 1 atmosphere for a period of 1 hour the composite will contain less than 0.6 weight percent exchangeable alkali metal as determined by base exchange with an excess of 25 percent aqueous ammonium chloride solution at 180° F. for 24 hours. By increasing the period of time, however, e.g., from 2 to 25 hours or more, the composite will contain less than about 0.4 weight percent and may contain less than 0.2 weight percent exchangeable alkali metal. The preferred temperature range thus ranges from at least 1100° F. for a period of at least one-half hour in the presence of steam under atmospheric pressure.

In general, control of the fixation operation can be readily achieved by conducting steaming of the reaction mixture as a step in the catalyst manufacturing process before applying the product to use as a catalyst. In the alternative, this final step can be conducted in the equipment in which the catalyst is to be employed. For example, it is common practice to operate many types of catalytic cracking units under conditions which provide steam atmospheres of adequate concentration at various points. The charge stock may be admitted to the reactor admixed with steam. Steam may be employed as purging or sealing medium, or both, between reactor and regenerator. Indeed, the regenerator may, itself, provide adequate concentration of steam as a sum of moisture in the air plus that generated by line burner, if any, and that resulting from hydrogen content, if any, of the "coke" burned from the catalyst in regeneration. The requisite time of steaming need not be one uninterrupted period, but may be the accumulation of successive shorter intervals. The essential feature is that the agent normally destructive of the catalytic agent may, in a proper reaction mixture, be the essential stabilizing agent. Thus, an effective mode of applying the invention is to supply the raw reaction mixture as make-up to an operating catalytic cracker.

Cracking, utilizing the catalyst described herein, may be carried out at catalytic cracking conditions employing a temperature within the approximate range of 700° F. to 1200° F. and under a pressure ranging from subatmospheric up to several hundred atmospheres. The contact time of the oil with the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fluidized mass, fixed bed, or as a compact particle-form moving bed.

The catalysts of the present invention are especially suitable for use in both the "moving-bed" and "fluid" cracking processes. In the "moving-bed process" (e.g., Thermofor Catalytic Cracking or TCC) catalyst particles are used which are generally in the range of about 0.08 to 0.25 inch in diameter. Useful reaction conditions include temperatures above about 850° F., pressures from subatmospheric to approximately 3 atmospheres, catalyst to oil ratios of about 1.5–15 and liquid hourly space velocities of about 0.5 to 6. In the "fluidized catalytic cracking" process (or FCC) catalyst particles are used which are generally in the range of 10 to 150 microns in diameter. The commercial FCC processes include one or both of two types of cracking zones—a dilute bed (or "riser") and a fluid (or dense) bed. Useful reaction conditions in fluid catalytic cracking include temperatures above 850° F., pressures from subatmospheric to 3 atmospheres, catalyst-to-oil ratios of 1 to 30, oil contact time less than about 12 to 15 seconds in the "riser," preferably less than about 6 seconds, wherein up to 100 percent of the desired conversion may take place in the "riser," and a catalyst residence (or contact) time of less than 15 minutes, preferably less than 10 minutes, in the fluidized (or dense) bed.

The catalysts described herein may also be used to catalyze a wide variety of different organic conversion processes other than cracking. A typical example is the use of such catalysts for hydrocracking hydrocarbon fractions such as gas oils, residual oils, cycle stocks, whole topped crudes and heavy hydrocarbon fractions derived by the destructive hydrogenation of coal, tars, pitches, asphalts, and the like. The hydrogenation component can include metals, oxides and sulfides of metals of the Periodic Table which fall in Group V including vanadium, Group VI including chromium, molybdenum, tungsten and the like, and Group VIII including cobalt, nickel, platinum, palladium, rhodium and the like, and combinations of metals, sulfides and oxides of metals of the foregoing such as nickel-tungsten sulfide, cobalt-molybdenum oxide, cobalt-molybenum, sulfide and the like. The amount of hydrogenation component can range from about 0.1 to about 30 weight percent based on the catalyst. The hydrogenation component may be combined with the catalyst composite in any feasible manner, such as impregnation, coprecipitation, cogellation, mechanical admixture and the like. The hydrocracking operation is generally carried out at a temperature between about 400° F. and about 950° F. The hydrogen pressure in such operation is generally within the range of about 100 and about 3000 p.s.i.g. and, preferably, about 350 to about 2000 p.s.i.g. The liquid hourly space velocity, i.e., the liquid volume of hydrocarbon per hour per volume of catalyst is between about 0.1 and about 10. In general, the molar ratio of hydrogen to hydrocarbon charge employed is between about 2 and about 80, and preferably, between about 5 and about 50.

The following examples illustrate the best mode now contemplated for carrying out the invention. In each of the following catalyst preparations the compositions were dried at 1000° F. for 10 hours prior to thermal interaction. In each example where exchangeable sodium is shown, this was determined on a small test sample. Calculations were made by subtracting the sodium content of the exchanged sample from that of the original sample. Catalytic data were obtained on the remainder of the example.

The following examples illustrate the use of various inorganic oxide matrices which can be used in accordance with the invention.

Example 1

In this example, 59.8 grams of a partially exchanged rare earth zeolite X aluminosilicate (6.3 weight percent Na) were mixed with 229 grams McNamee Kaolin clay and 600 cc. water for 2 minutes in a blender. The resulting slurry, after being dried to remove the liquid phase was thermally treated at 1225° F. with 100% steam for 20 hours at atmospheric pressure followed by a second thermal treatment at 1200° F. with 100% steam for 24 hours under a pressure of 15 p.s.i.g. The product analyzed 0.84 weight percent sodium. Upon treating a test sample of the composite with an excess of 25% aqueous ammonium chloride solution at 180° F. for 24 hours substantially no sodium was removed from the sample.

Example 2

In this example, a partially exchanged calcium zeolite X aluminosilicate (6.3 weight percent Na) was mixed with McNamee Kaolin clay in the same manner as Example 6. The sample analyzed 1.3 weight percent sodium and upon treating a test sample of the composite with excess ammonium chloride solution substantially no sodium was removed from the sample.

Example 3

In this example, a partially exchanged manganese zeolite X aluminosilicate (6.3 weight percent Na) was mixed with McNamee Kaolin clay in the same manner as Example 6. The sample analyzed 1.3 weight percent sodium and upon treating a test sample of the composite with excess ammonium chloride solution substantially no sodium was removed from the sample.

The catalytic evaluation of these catalysts is shown in the following table.

TABLE

| Example | 1 | 2 | 3 |
|---|---|---|---|
| Composition: | | | |
| Na, wt. percent | 0.84 | 1.3 | 1.3 |
| Na, wt. percent, exchangeable | Nil | Nil | Nil |
| Catalytic evaluation: | | | |
| Conditions: | | | |
| LHSV | 4 | 4 | 4 |
| C/O | 1.5 | 1.5 | 1.5 |
| Conversion, vol. percent | 60.9 | 51.5 | 52.0 |
| $C_5$+Gasoline, vol. percent | 52.7 | 45.8 | 47.0 |
| Total $C_4$'s, vol. percent | 11.9 | 9.6 | 8.9 |
| Dry gas, wt. percent | 5.1 | 4.2 | 4.0 |
| Coke, wt. percent | 1.6 | 1.2 | 1.1 |
| $H_2$, wt. percent | 0.04 | 0.04 | 0.04 |
| Delta advantage over Si/Al, $C_5$+Gasoline, vol. percent | +9.8 | +8.1 | +9.6 |

What is claimed is:
1. A process for preparing a catalyst composite which comprises forming a reaction mixture comprising:

(a) a matrix composed of at least two inorganic oxides wherein at least one inorganic oxide is selected from the group consisting of siliceous oxides and alumina-containing oxides, with the proviso that the siliceous oxide be present in amounts no greater than 90 weight percent, based on the weight of the matrix, and any alumina-containing oxide be present in amounts of at least 10 weight percent, based on the weight of the matrix;

(b) a crystalline metal aluminosilicate of the X type characterized by containing cations of at least one metal selected from the group consisting of rare earth, calcium, manganese, and magnesium and have associated therewith at least 4 but less than 10 wt. percent of alkali metal cations, said aluminosilicate being present in an amount less than 60 percent by weight, based on the final composite;

and thereafter heating said reaction mixture in the presence of steam at temperatures of at least 800° F. for at least one-half hour in order to reduce the exchangeable alkali metal content of the reaction mixture and to provide a catalyst composition having an exchangeable alkali metal content of not more than 0.6 weight percent as determined by base exchange with an excess of 25 percent aqueous ammonium chloride solution at 180° F. for 24 hours.

2. The process of claim 1 wherein at least one of the inorganic oxides of the matrix is alumina present in an amount ranging from 15 to 55 weight percent, based on total matrix.

3. The process of claim 2 wherein the matrix is a member selected from the group consisting of natural clay, chemically treated clay and calcined clay.

4. The process of claim 2 wherein the matrix is a synthetic composite of silica and alumina having an alumina content of at least 25 weight percent.

5. The process of claim 2 wherein said compound is a salt of a rare earth metal.

6. The process of claim 3 wherein the matrix is a member selected from the group of clays classified as kaolinite clays—namely, kaolinite, dickite, nacrite and halloysite.

References Cited
UNITED STATES PATENTS 2,375,756   5/1945   Batas _____ 208—120
3,257,310   6/1966   Plank et al. _____ 208—120

DANIEL E. WYMAN, Primary Examiner

C. F. DEES, Assistant Examiner

U.S. Cl. X.R.
208—120